US012810651B2

(12) United States Patent
Hsiao

(10) Patent No.: US 12,810,651 B2
(45) Date of Patent: Nov. 24, 2026

(54) SYSTEMS AND METHODS FOR PERFORMING VIRTUAL APPLICATION OF ACCESSORIES USING A HANDS-FREE INTERFACE

(71) Applicant: Perfect Mobile Corp., New Taipei City (TW)

(72) Inventor: Teng-Yuan Hsiao, Taipei City (TW)

(73) Assignee: PERFECT MOBILE CORP., New Taipei City (TW)

( * ) Notice: Subject to any disclaimer, the term of this patent is extended or adjusted under 35 U.S.C. 154(b) by 435 days.

(21) Appl. No.: 18/046,278

(22) Filed: Oct. 13, 2022

(65) Prior Publication Data

US 2023/0120754 A1 Apr. 20, 2023

Related U.S. Application Data

(60) Provisional application No. 63/257,217, filed on Oct. 19, 2021.

(51) Int. Cl.
*G06V 40/20* (2022.01)
*G06V 20/40* (2022.01)
*G06V 40/16* (2022.01)

(52) U.S. Cl.
CPC .............. *G06V 40/20* (2022.01); *G06V 20/46* (2022.01); *G06V 40/16* (2022.01)

(58) Field of Classification Search
CPC ........ G06V 40/20; G06V 20/46; G06V 40/16; G06V 20/20; G06V 40/161; G06V 40/171
See application file for complete search history.

(56) References Cited

U.S. PATENT DOCUMENTS

| | | | | |
|---|---|---|---|---|
| 10,157,416 | B2 | 12/2018 | Adeyoola et al. | |
| 10,891,785 | B2 | 1/2021 | Tran | |
| 11,073,915 | B2 | 7/2021 | Rose et al. | |
| 2016/0267577 | A1 | 9/2016 | Crowder et al. | |
| 2018/0275766 | A1 * | 9/2018 | Condolo | G06F 3/0304 |
| 2018/0336715 | A1 * | 11/2018 | Rickwald | G06F 3/012 |

(Continued)

FOREIGN PATENT DOCUMENTS

| | | | |
|---|---|---|---|
| CN | 104461006 | A | 3/2015 |
| CN | 107358493 | A | 11/2017 |
| CN | 108227922 | A | 6/2018 |

(Continued)

OTHER PUBLICATIONS

"Snapchat boosts AR try-on tools: Farfetch, Prada dive in;" Vogue Business; May 2021; pp. 1-9.

(Continued)

*Primary Examiner* — David F Dunphy
(74) *Attorney, Agent, or Firm* — McClure, Qualey & Rodack, LLP

(57) ABSTRACT

A computing device captures a live video of a user's head and generates a virtual mirror displaying the live video of the user's head. The computing device tracks ear regions on the user's head and performs virtual application of a set of earrings on the ear regions on the user's head. The computing device monitors for a target motion among a plurality of predefined target motions by the user. When at least one target motion is detected, the computing device changes the set of earrings with another set of earrings.

15 Claims, 9 Drawing Sheets

(56) References Cited

U.S. PATENT DOCUMENTS

| | | | | |
|---|---|---|---|---|
| 2019/0371028 | A1 | 12/2019 | Harrises et al. | |
| 2022/0197459 | A1* | 6/2022 | Tashjian ............. | G06Q 30/0643 |

FOREIGN PATENT DOCUMENTS

| | | | |
|---|---|---|---|
| CN | 106897916 | B | 1/2021 |
| KR | 10-2017-0133455 | A | 12/2017 |
| KR | 10-2018-0104051 | A | 9/2018 |
| WO | 2015/020703 | A1 | 2/2015 |
| WO | 2021/137752 | A1 | 7/2021 |

OTHER PUBLICATIONS

"Revealing Smart Mirrors Show What You Would Look Like Wearing;" https://www.youtube.com/watch?v=INKJRItaUml; Mar. 2018; pp. 1-3.
"Timberland Augmented Reality Campaign;" https://www.youtube.com/watch?v=5TZmQPdhpak; Nov. 2014; pp. 1-3.
"Jabberwocky App Demo;" https://www.youtube.com/watch?v=z-KtKvDMpok; May 2019; pp. 1-3.

* cited by examiner

SYSTEMS AND METHODS FOR PERFORMING VIRTUAL APPLICATION OF ACCESSORIES USING A HANDS-FREE INTERFACE

CROSS-REFERENCE TO RELATED APPLICATION

This application claims priority to, and the benefit of, U.S. Provisional Patent Application entitled, "Switching between multiple products for earring virtual try-on," having Ser. No. 63/257,217, filed on Oct. 19, 2021, which is incorporated by reference in its entirety.

TECHNICAL FIELD

The present disclosure generally relates to media editing and more particularly, to systems and methods for performing virtual application of accessories using a hands-free interface.

BACKGROUND

With the proliferation of smartphones, tablets, and other display devices, people have the ability to view and edit digital content virtually any time where application programs have become popular on smartphones and other portable display devices for editing and viewing media content. However, it can be cumbersome to utilize input devices or touchscreen interfaces to perform virtual application of jewelry such as earrings and other accessories. Therefore, there is a need for an improved system and method for allowing users to perform the virtual application of accessories.

SUMMARY

In accordance with one embodiment, a computing device captures a live video of a user's head and generates a virtual mirror displaying the live video of the user's head. The computing device tracks ear regions on the user's head and performs virtual application of a set of earrings on the ear regions on the user's head. The computing device monitors for a target motion among a plurality of predefined target motions by the user. When at least one target motion is detected, the computing device changes the set of earrings with another set of earrings.

Another embodiment is a system that comprises a memory storing instructions and a processor coupled to the memory. The processor is configured by the instructions to capture a live video of a user's head and generate a virtual mirror displaying the live video of the user's head. The processor is further configured to track ear regions on the user's head and perform virtual application of a set of earrings on the ear regions on the user's head. The processor is further configured to monitor for a target motion among a plurality of predefined target motions by the user. When at least one target motion is detected, the processor is further configured to change the set of earrings with another set of earrings.

Another embodiment is a non-transitory computer-readable storage medium storing instructions to be implemented by a computing device having a processor, wherein the instructions, when executed by the processor, cause the computing device to capture a live video of a user's head and generate a virtual mirror displaying the live video of the user's head. The processor is further configured to track ear regions on the user's head and perform virtual application of a set of earrings on the ear regions on the user's head. The processor is further configured to monitor for a target motion among a plurality of predefined target motions by the user. When at least one target motion is detected, the processor is further configured to change the set of earrings with another set of earrings.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Various embodiments are disclosed for performing hands-free virtual application of accessories, whereby users are able to navigate a user interface using one or more target motions. Although augmented reality systems exist that superimpose graphics on an object such as a user's face, it can be cumbersome to utilize input devices or touchscreen interfaces to perform virtual application of jewelry such as earrings and other accessories. Therefore, there is a need for an improved system and method for allowing users to perform the virtual application of accessories.

Figure 1:
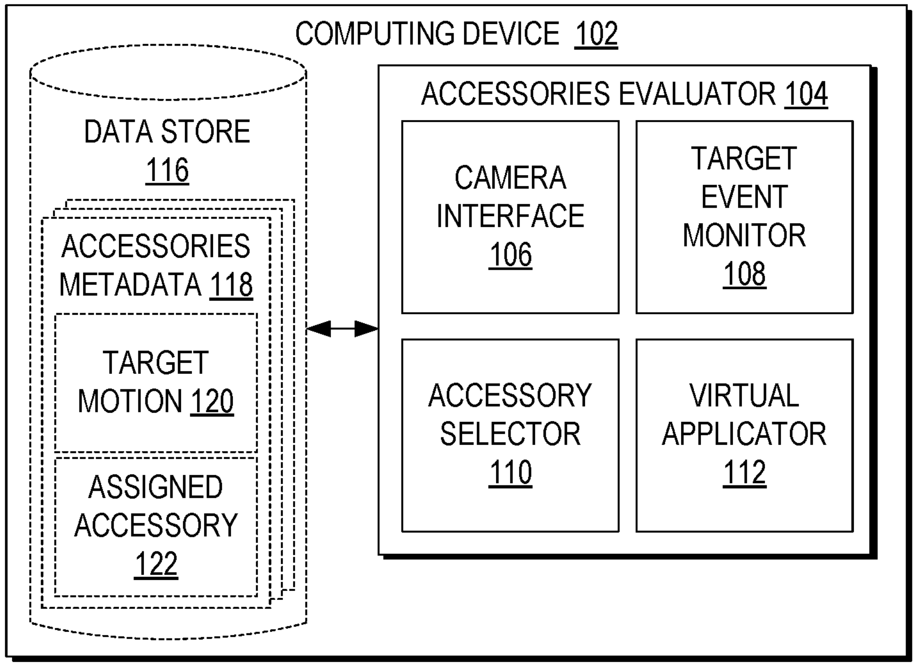
FIG. 1 is a block diagram of a computing device for performing hands-free virtual application of accessories in accordance with various embodiments of the present disclosure.

A description of a system for performing hands-free virtual application of accessories is now described followed by a discussion of the operation of the components within the system. FIG. 1 is a block diagram of a computing device 102 in which a service for performing virtual application of accessories disclosed herein may be implemented. The computing device 102 may be embodied as a computing device such as, but not limited to, a smartphone, a tablet computing device, a laptop, and so on.

An accessories evaluator 104 executes on a processor of the computing device 102 and includes a camera interface 106, a target event monitor 108, an accessory selector 110, and a virtual applicator 112. The camera interface 106 is configured to record and store a live video of a user's head, where an integrated front facing camera of the computing device 102 or a digital camera coupled to the computing device 102 may be utilized to record the video.

As one of ordinary skill will appreciate, the video captured by the camera interface 106 may be encoded in any of a number of formats including, but not limited to Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The camera interface 106 is also configured to generate a user interface on a display of the computing device 102, where the user interface includes a virtual mirror feature that displays the live video captured by the camera interface 106. The virtual mirror feature allows the user to evaluate the virtual application of different accessories such as earrings and other jewelry.

The target event monitor 108 is configured to track a target facial feature associated with a selected accessory. The target facial feature may comprise, for example, the ear regions of the user. For some embodiments, the event monitor 108 tracks the ear regions by detecting a facial region in the live video and determining the ear regions within the detected facial region.

The virtual applicator 112 is configured to perform virtual application of a set of earrings on the ear regions of the user's head. For some embodiments, the user is wearing an actual set of earrings, and the user is able to try on other earrings via the virtual applicator 112. Alternatively, the user can select an initial set of earrings for the virtual applicator 112 to virtually apply to the ear regions. In yet other embodiments, if the user is not wearing any earrings, the virtual applicator 112 can virtually apply a default set of earrings based, for example, on the makeup being worn by the user or other attributes of the user's facial region. As described below, the user can then try on other earrings in place of the default or previous set of earrings. Once virtual application of earrings is performed, the target event monitor 108 monitors for a target motion among a plurality of predefined target motions 120 by the user. When at least one of the predefined target motions 120 is performed by the user, the accessory selector 110 accesses a data store 116 in the computing device 102 to retrieve accessories metadata 118.

The accessory selector 110 identifies a target motion that matches the detected target motion performed by the user and retrieves an assigned accessory 122 specified in the accessories metadata 118. For some embodiments, the target event monitor 108 monitors for the target motion among a plurality of predefined target motions 120 by detecting changes in the yaw, pitch, and/or roll angles when the user's head moves. The target event monitor 108 cycles between different earrings based on the detected changes in the yaw, pitch, and/or roll angles when the user's head moves, where a direction in which different earrings are cycled is based on how the user's head moves.

For some embodiments, the target event monitor 108 monitors for the target motion among a plurality of predefined target motions 120 by detecting a head nod and/or shaking of the head side to side. The target event monitor 108 cycles between different earrings based on the detected head nod and/or shaking of the head side to side, where a direction in which different earrings are cycled is based on how the user's head moves. For example, if the user's head moves to the right, the different earrings are cycled in one direction, and if the user's head moves to the left, the different earrings are cycled in the other direction. As another example, if the user's head nods in an upward direction, the different earrings are cycled in one direction, and if the user nods in a downward direction, the different earrings are cycled in the other direction.

For some embodiments, the target event monitor 108 monitors for the target motion among a plurality of predefined target motions 120 by monitoring for a target finger motion that comprises placement of a finger within a threshold distance of one of the ear regions on the user's head. For example, if the target event monitor 108 detects placement of a finger within a threshold distance of the right ear region, the different earrings are cycled in one direction, and if the target event monitor 108 detects placement of a finger within a threshold distance of the left ear region, the different earrings are cycled in the other direction.

For some embodiments, the target event monitor 108 monitors for the target motion among a plurality of predefined target motions 120 by monitoring for a target finger motion that comprises a finger touching an earlobe of the one of the ear regions. For example, if the target event monitor 108 detects the finger touching an earlobe of the right ear region, the different earrings are cycled in one direction, and if the target event monitor 108 detects the finger touching an earlobe of the left ear region, the different earrings are cycled in the other direction.

For some embodiments, the target event monitor 108 monitors for the target motion among a plurality of predefined target motions 120 by monitoring for shaking of a finger within a threshold distance of the one of the ear regions. For example, if the target event monitor 108 detects shaking of the finger within a threshold distance of the right ear region, the different earrings are cycled in one direction, and if the target event monitor 108 detects shaking of the finger within a threshold distance of the left ear region, the different earrings are cycled in the other direction.

The virtual applicator then replaces the set of earrings with the accessory 122 retrieved by the accessory selector 110. In this regard, the user is able to evaluate the virtual application of desired accessories by performing one or more predefined motions without having to utilize an input device or a touchscreen interface.

Figure 2:
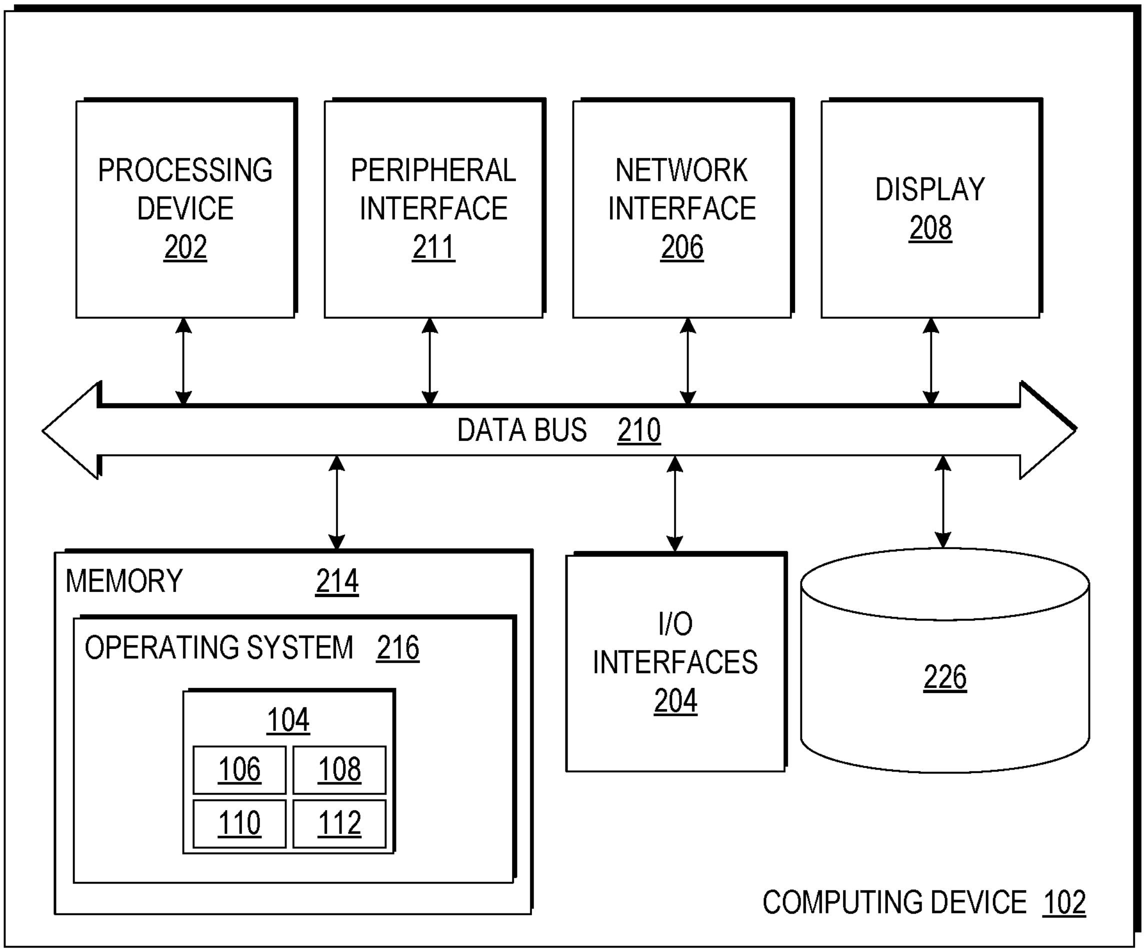
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
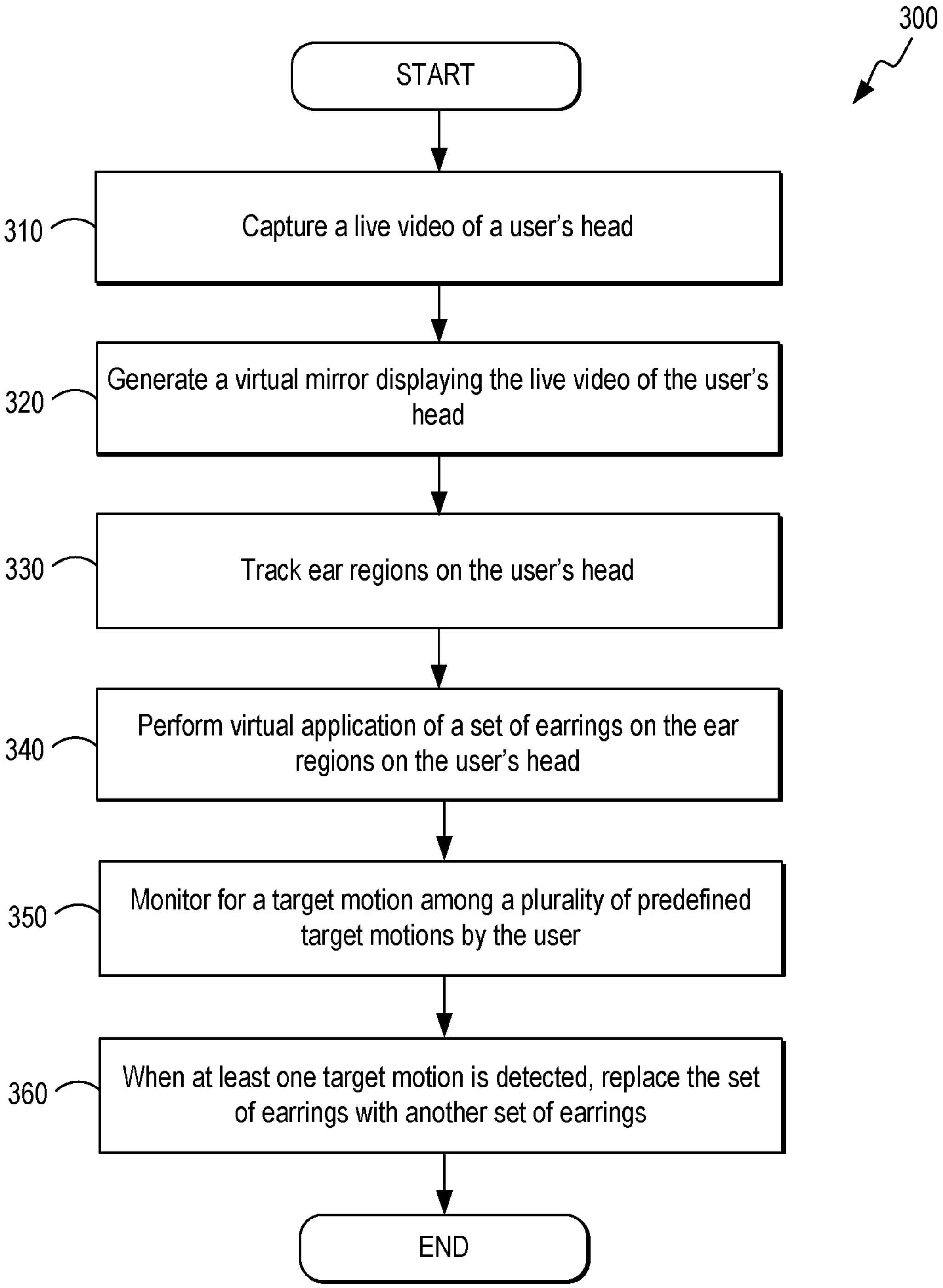
FIG. 3 is a top-level flowchart illustrating examples of functionality implemented as portions of the computing device of FIG. 1 for hands-free virtual application of accessories according to various embodiments of the present disclosure.

Reference is made to FIG. 3, which is a flowchart 300 in accordance with various embodiments for implementing hands-free virtual application of accessories performed by the computing device 102 of FIG. 1. It is understood that the flowchart 300 of FIG. 3 merely provides an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. In addition, two or more blocks shown in succession in FIG. 3 may be executed concurrently or with partial concurrence. It is understood that all such variations are within the scope of the present disclosure.

At block 310, the computing device 102 captures a live video of a user's head. At block 320, the computing device 102 generates a virtual mirror displaying the live video of the user's head. At block 330, the computing device 102 tracks ear regions on the user's head. For some embodiments, the computing device 102 tracks the ear regions by detecting a facial region in the live video and determining the ear regions within the detected facial region.

At block 340, the computing device 102 performs virtual application of a set of earrings on the ear regions on the user's head. For some embodiments, the set of earrings may be determined by the computing device 102 based on attributes of the user's facial region, where such attributes may comprise makeup worn by the user.

At block 350, the computing device 102 monitors for a target motion among a plurality of predefined target motions by the user. For some embodiments, the computing device 102 monitors for the target motion among a plurality of predefined target motions by detecting changes in the yaw, pitch, and/or roll angles when the user's head moves. The computing device 102 cycles between different earrings based on the detected changes in the yaw, pitch, and/or roll angles when the user's head moves, where a direction in which different earrings are cycled is based on how the user's head moves.

For some embodiments, the computing device 102 monitors for the target motion among a plurality of predefined target motions by detecting a head nod and/or shaking of the head side to side. Shaking of the head side to side can comprise, for example, the user simply moving his head to the right or to the left and either maintaining that position or returning the head to the center position. Alternatively, shaking of the head side to side can comprise the user shaking his head side to side in one continuous motion (e.g., motion expressing "no"). The computing device 102 cycles between different earrings based on the detected head nod and/or shaking of the head side to side, where a direction in which different earrings are cycled is based on how the user's head moves. For example, if the user's head moves to the right, the different earrings are cycled in one direction, and if the user's head moves to the left, the different earrings are cycled in the other direction. As another example, if the user's head nods in an upward direction, the different earrings are cycled in one direction, and if the user nods in a downward direction, the different earrings are cycled in the other direction.

For some embodiments, the computing device 102 monitors for the target motion among a plurality of predefined target motions by monitoring for a target finger motion that comprises placement of a finger within a threshold distance of one of the ear regions on the user's head. For example, if the computing device 102 detects placement of a finger within a threshold distance of the right ear region, the different earrings are cycled in one direction, and if the computing device 102 detects placement of a finger within a threshold distance of the left ear region, the different earrings are cycled in the other direction. For some embodiments, if the computing device 102 detects placement of a finger within a threshold distance of the right ear region, only the earring on the right ear is changed and the previous earring on the left ear remains. If the computing device 102 detects placement of a finger within a threshold distance of the left ear region, only the earring on the left ear is changed and the previous earring on the right ear remains. In this regard, the user is able to separately change the earrings for each ear. In other embodiments, however, changing the earrings for one ear will automatically trigger the same change in earrings for the other ear.

For some embodiments, the computing device 102 monitors for the target motion among a plurality of predefined target motions by monitoring for a target finger motion that comprises a finger touching an earlobe of the one of the ear regions. For example, if the computing device 102 detects the finger touching an earlobe of the right ear region, the different earrings are cycled in one direction, and if the computing device 102 detects the finger touching an earlobe of the left ear region, the different earrings are cycled in the other direction. For some embodiments, if the computing device 102 detects the finger touching an earlobe of the right ear region, only the earring on the right ear is changed and the previous earring on the left ear remains. If the computing device 102 detects the finger touching an earlobe of the left ear region, only the earring on the left ear is changed and the previous earring on the right ear remains. In this regard, the user is able to separately change the earrings for each ear. In other embodiments, however, changing the earrings for one ear will automatically trigger the same change in earrings for the other ear.

For some embodiments, the computing device 102 monitors for the target motion among a plurality of predefined target motions by monitoring for shaking of a finger within a threshold distance of the one of the ear regions. For example, if the computing device 102 detects shaking of the finger within a threshold distance of the right ear region, the different earrings are cycled in one direction, and if the computing device 102 detects shaking of the finger within a threshold distance of the left ear region, the different earrings are cycled in the other direction. For some embodiments, if the computing device 102 detects shaking of the finger within a threshold distance of the right ear region, only the earring on the right ear is changed and the previous earring on the left ear remains. If the computing device 102 detects shaking of the finger within a threshold distance of the left ear region, only the earring on the left ear is changed and the previous earring on the right ear remains. In this regard, the user is able to separately change the earrings for each ear. In other embodiments, however, changing the earrings for one ear will automatically trigger the same change in earrings for the other ear. At block 360, when at least one target motion is detected, the computing device 102 replaces the set of earrings with another set of earrings. Thereafter, the process in FIG. 3 ends.

Figure 4:
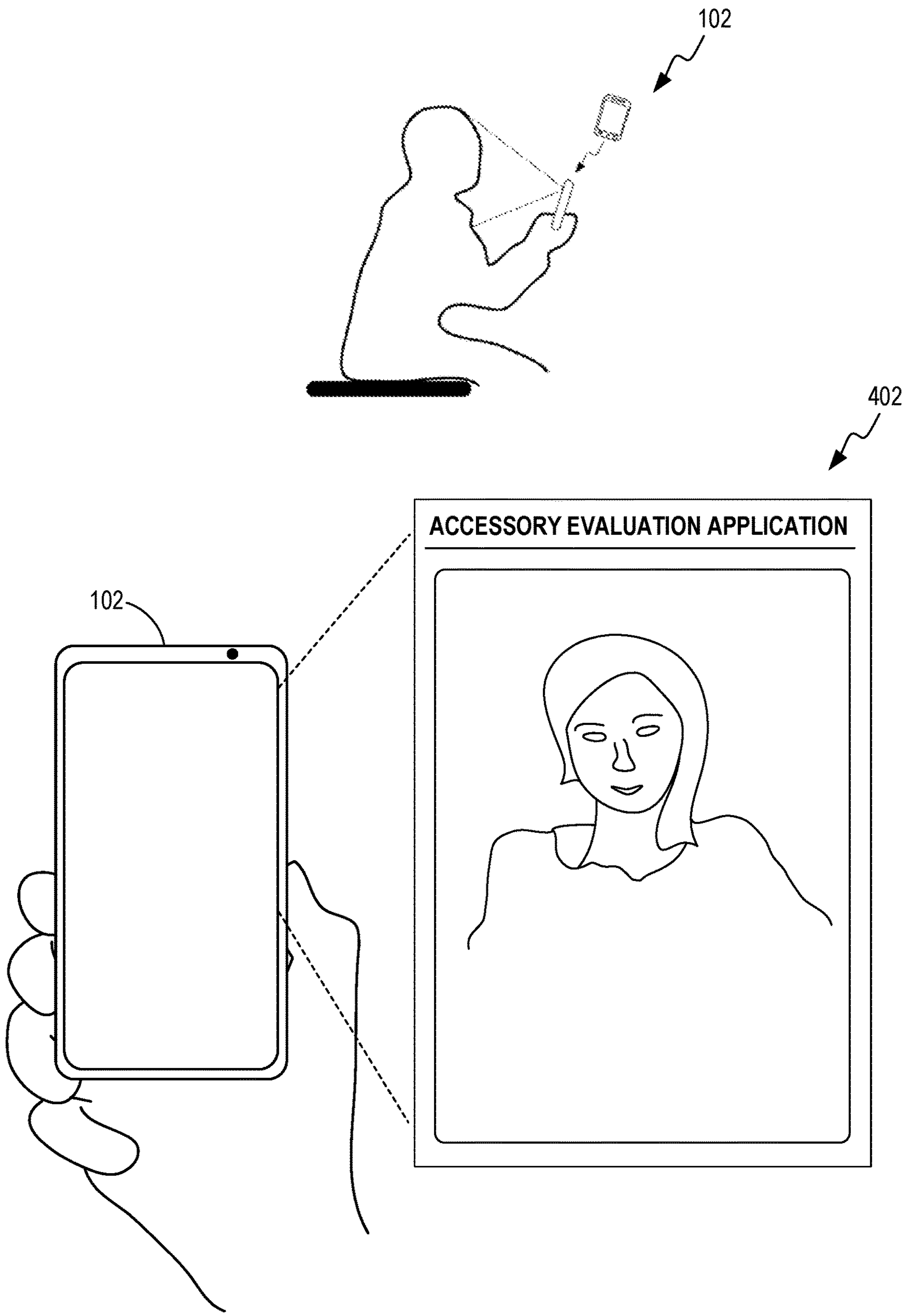
FIG. 4 illustrates an example user interface with a virtual mirror feature generated on a display of the computing device whereby a digital image of a user is shown in the user interface according to various embodiments of the present disclosure.

FIG. 4 illustrates an example user interface 402 with a virtual mirror feature generated on a display of the computing device 102 whereby a digital image of a user is shown in the user interface 402. For some embodiments, the computing device 102 is equipped with a front facing camera that captures a video of the user.

Figure 5:
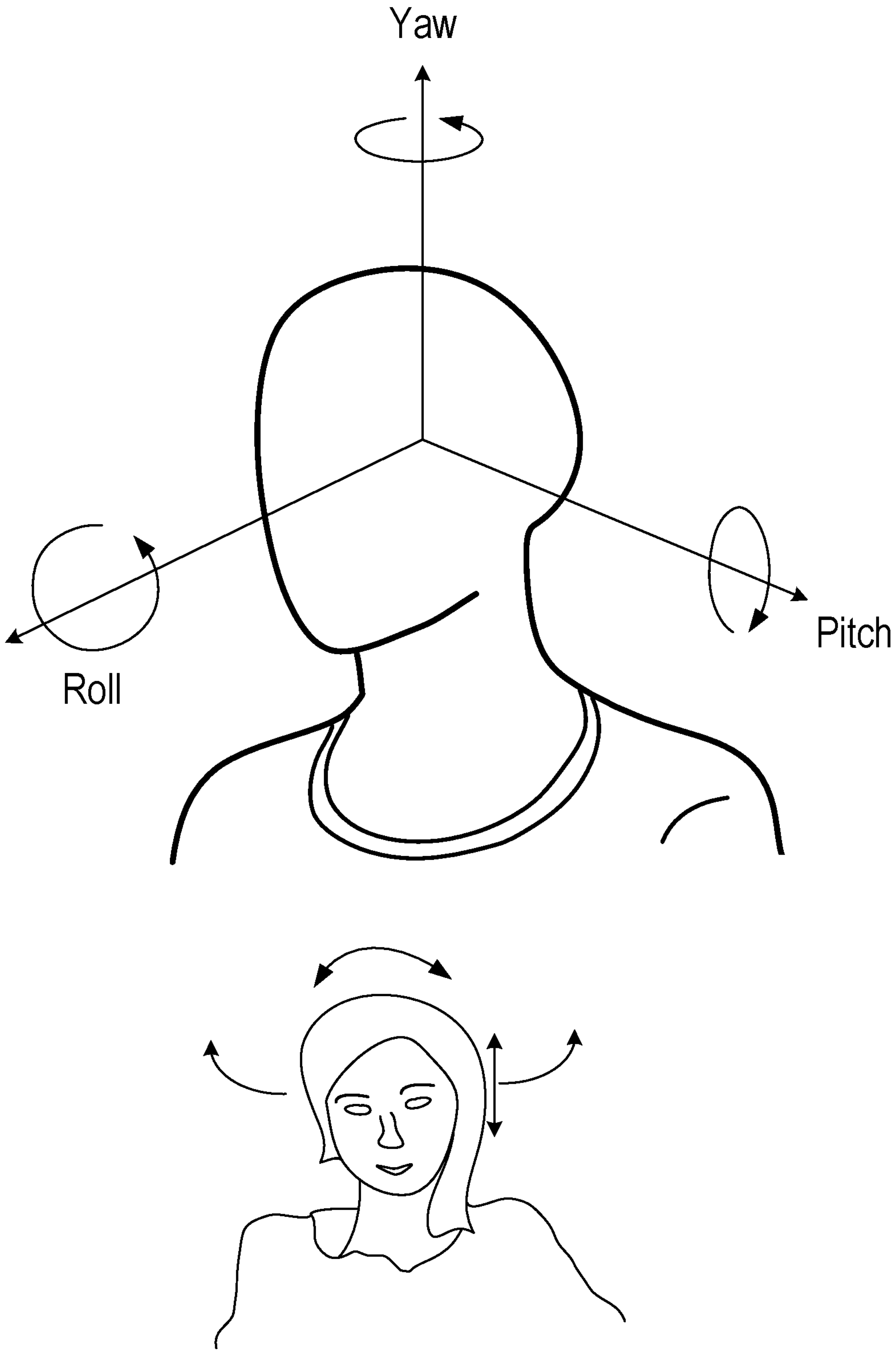
FIG. 5 illustrates how the user's head may be oriented according to different pitch, roll, and yaw rotations according to various embodiments of the present disclosure.

FIG. 5 illustrates how the user's head may be oriented according to different pitch, roll, and yaw rotations. For some embodiments, the target event monitor 108 (FIG. 1) monitors for a first type of predefined motions comprising movement of the user's head. When movement of the user's head is detected, the target event monitor 108 determines the initial coordinates of a location of the user's head in an initial orientation. The target event monitor 108 detects changes in yaw, pitch, and roll angles when the user's head moves. When a threshold change in yaw, pitch, and roll angles is detected, the computing device 102 retrieves an assigned set of earrings corresponding to the detected threshold change in yaw, pitch, and roll angles.

Figure 6:
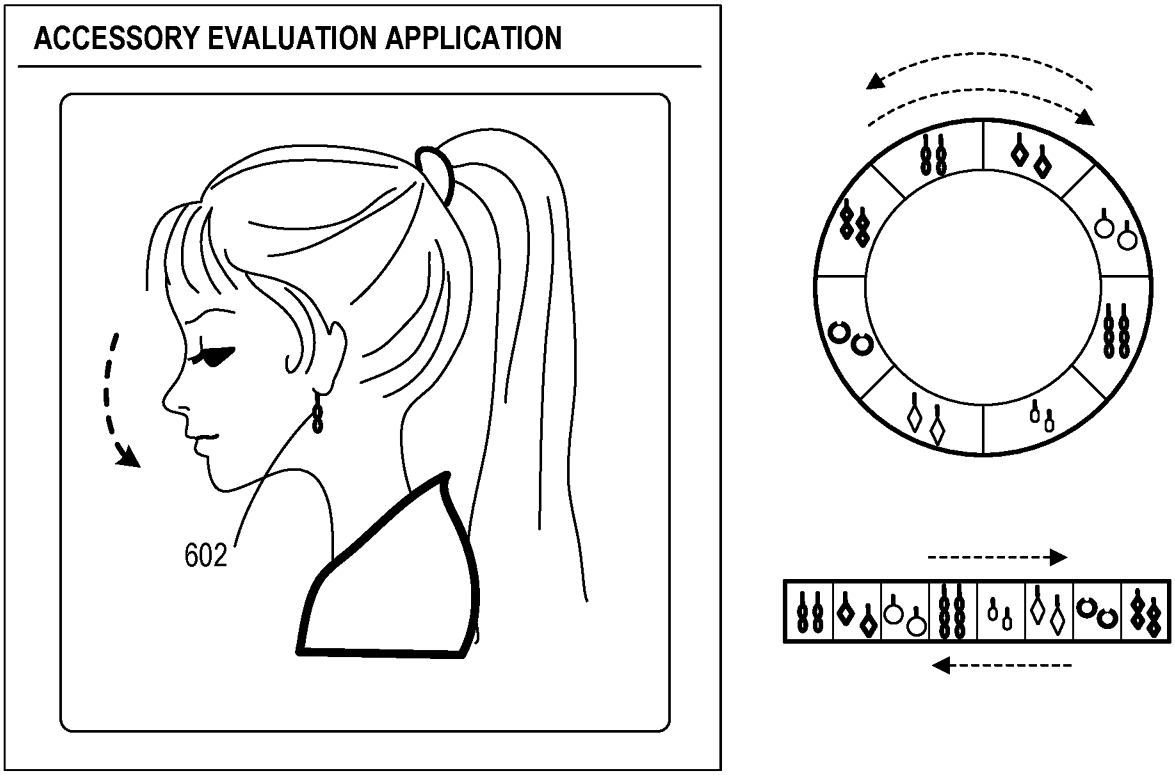
FIG. 6 illustrates the user switching earrings using a first type of predefined target motion according to various embodiments of the present disclosure.

FIG. 6 illustrates the user switching earrings using a first type of predefined target motion. For some embodiments, the target event monitor 108 executing in the computing device 102 (FIG. 1) monitors for a first type of predefined motions comprising movement of the user's head. When movement of the user's head is detected, the target event monitor 108 detects a head nod, shaking of the head side to side, or a combination of the two head motions. In the example shown, the user is initially shown with a default/previous set of earrings 602 virtually applied to the user's ear. As described earlier, the default/previous set of earrings may be determined by the computing device 102 based on attributes of the user's facial region, where such attributes may comprise makeup worn by the user.

As shown in FIG. 6, different modes may be implemented for switching between different sets of earrings. A circular mode may be implemented whereby cycling between different sets of earrings is triggered based on the detection of one or more target motions. As an alternative, a row mode may be implemented whereby switching between sets of earrings in a forward direction or in a reverse direction may be utilized. In the row mode of switching, once the user reaches the last set of earrings on either the right-most or left-most cell of the row, no further switching is performed. This lets the user know that no further selections are available. In contrast, in the circular mode of switching, the user can continuously switch between different sets of earrings regardless of the number of available earrings.

Figure 7:
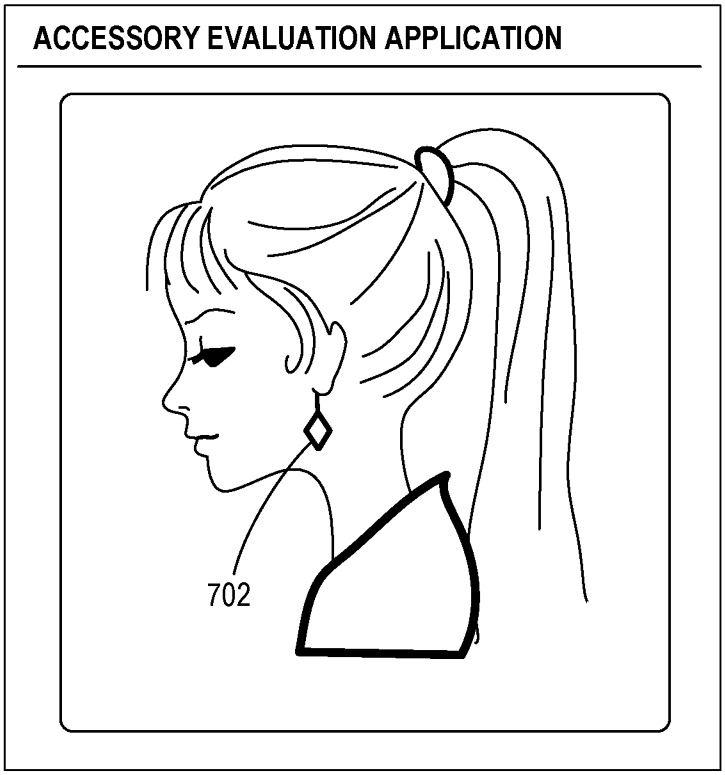
FIG. 7 illustrates the default/previous set of earrings being replaced with a different set of earrings according to various embodiments of the present disclosure.

FIG. 7 illustrates the default/previous set of earrings being replaced with a different set of earrings. In the example shown, the target event monitor 108 (FIG. 1) detects that the user has nodded her head. This causes the accessory selector 110 (FIG. 1) to retrieve accessories metadata 118 (FIG. 1) from the data store 116 (FIG. 1) and obtain a set of earrings that corresponds to the target motion (i.e., nodding of the user's head). Once the accessory selector 110 retrieves the appropriate set of earrings, the virtual applicator 112 (FIG. 1) replaces the default/previous set of earrings with the set of earrings 702 retrieved by the accessory selector 110.

Figure 8:
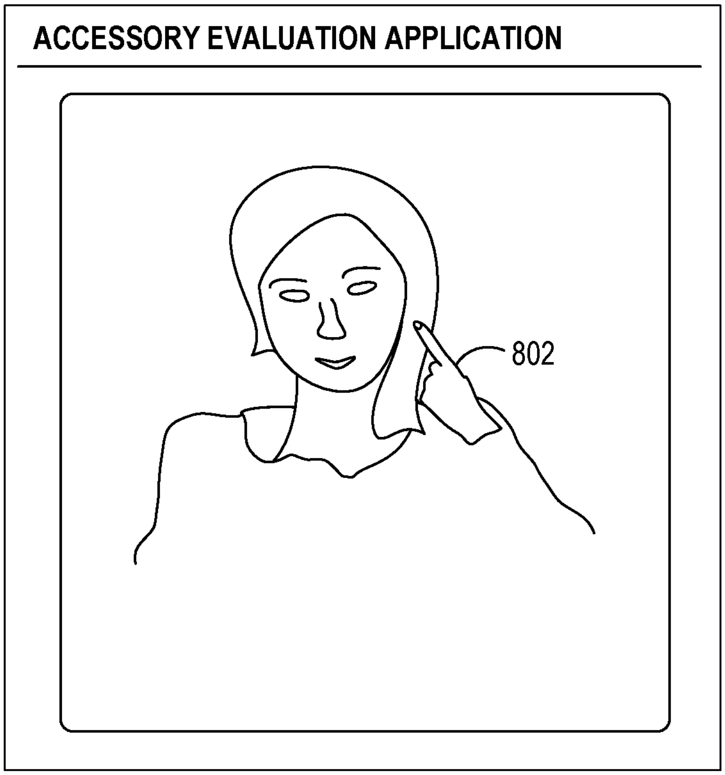
FIG. 8 illustrates the user switching earrings using a second type of predefined target motion according to various embodiments of the present disclosure.

FIG. 8 illustrates the user switching earrings using a second type of predefined target motion. When the target event monitor 108 (FIG. 1) detects movement of the user's finger, the target event monitor 108 monitors for a specific target finger motion 802 that comprises placement of a finger within a threshold distance of one of the ear regions on the user's head. When a target finger motion 802 is detected, the accessory selector 110 (FIG. 1) again retrieves accessories metadata 118 (FIG. 1) from the data store 116 (FIG. 1) and obtains a set of earrings that corresponds to the target motion (i.e., placement of a finger within a threshold distance of one of the ear regions on the user's head).

For some embodiments, if the target event monitor 108 detects the target finger motion 802 within a threshold distance of the right ear region, only the earring on the right ear is changed and the previous earring on the left ear remains. If the target event monitor 108 detects the target finger motion 802 within a threshold distance of the left ear region, only the earring on the left ear is changed and the previous earring on the right ear remains. In this regard, the user is able to separately change the earrings for each ear. In other embodiments, however, changing the earrings for one ear will automatically trigger the same change in earrings for the other ear.

Figure 9:
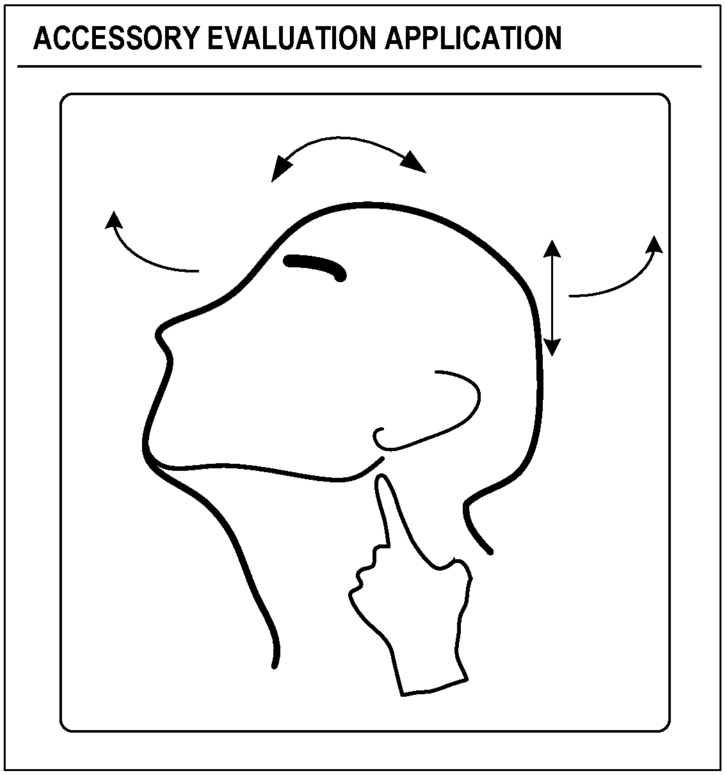
FIG. 9 shows an example where the user switches between sets of earrings using a combination of the first type and second type of predefined target motions according to various embodiments of the present disclosure.

Once the accessory selector 110 retrieves the appropriate set of earrings, the virtual applicator 112 (FIG. 1) replaces the default/previous set of earrings with the set of earrings 702 retrieved by the accessory selector 110. As described above in connection with FIG. 6, different modes may be implemented for switching between different sets of earrings. Note that the user is not limited to using either the first type or second type of predefined target motion. FIG. 9 shows an example where the user switches between sets of earrings using a combination of the first type and second type of predefined target motions.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device, comprising:

capturing a live video of a user's head;

generating a virtual mirror displaying the live video of the user's head;

tracking ear regions on the user's head;

performing virtual application of a set of earrings on the ear regions on the user's head;

monitoring for a target motion by the user's head among a plurality of predefined target motions, wherein monitoring for the target motion among a plurality of predefined target motions by the user comprises:

detecting a threshold change in yaw angle when the user's head moves and based on the threshold change in yaw angle, detecting shaking of the user's head side to side; and cycling between different earrings based on the detected at least one of: the head nod or shaking of the user's head side to side, wherein a direction in which different earrings are cycled is based on how the user's head moves; and when at least one target motion by the user's head is detected, changing the set of earrings with another set of earrings; and monitoring for a target finger motion comprising placement of a finger within a threshold distance of one of the ear regions on the user's head, wherein responsive to placement of the finger within the threshold distance of one of the ear regions on the user's head, only an earring for the one of the ear regions is changed while an earring for the other one of the ear regions remains unchanged.

2. The method of claim 1, wherein tracking the ear regions comprises:

detecting a facial region in the live video; and determining the ear regions within the detected facial region.

3. The method of claim 1, wherein if the user's head moves to the right, the different earrings are cycled in one direction, and wherein if the user's head moves to the left, the different earrings are cycled in the other direction.

4. The method of claim 1, wherein if the user's head nods in an upward direction, the different earrings are cycled in one direction, and wherein if the user's head nods in a downward direction, the different earrings are cycled in the other direction.

5. The method of claim 1, further comprising monitoring for a target finger motion comprising a finger touching an earlobe of the one of the ear regions.

6. The method of claim 1, further comprising monitoring for shaking of a finger within a threshold distance of the one of the ear regions.

7. The method of claim 1, wherein an upward head nod results in different earrings being cycled in a first direction, and a downward head nod results in different earrings being cycled in an opposite direction; and wherein movement of the user's head to the right results in different earrings being cycled in the first direction, and movement of the user's head to the left results in different earrings being cycled in the opposite direction.

8. A system, comprising:

a memory storing instructions;

a processor coupled to the memory and configured by the instructions to at least:

capture a live video of a user's head;

generate a virtual mirror displaying the live video of the user's head;

track ear regions on the user's head;

perform virtual application of a set of earrings on the ear regions on the user's head;

monitor for a target motion by the user's head among a plurality of predefined target motions, wherein the processor is configured to monitor for the target motion among a plurality of predefined target motions by:

detecting a threshold change in yaw angle when the user's head moves and based on the threshold change in yaw angle, detecting shaking of the user's head side to side; and cycling between different earrings based on the detected at least one of: the head nod or shaking of the user's head side to side, wherein a direction in which different earrings are cycled is based on how the user's head moves; and when at least one target motion by the user's head is detected, change the set of earrings with another set of earrings; and monitor for a target finger motion comprising placement of a finger within a threshold distance of one of the ear regions on the user's head, wherein responsive to placement of the finger within the threshold distance of one of the ear regions on the user's head, only an earring for the one of the ear regions is changed while an earring for the other one of the ear regions remains unchanged.

9. The system of claim 8, wherein if the user's head moves to the right, the different earrings are cycled in one direction, and wherein if the user's head moves to the left, the different earrings are cycled in the other direction.

10. The system of claim 8, wherein if the user's head nods in an upward direction, the different earrings are cycled in one direction, and wherein if the user's head nods in a downward direction, the different earrings are cycled in the other direction.

11. The system of claim 8, wherein the processor is further configured to monitor for a target finger motion comprising a finger touching an earlobe of the one of the ear regions.

12. The system of claim 8, wherein the processor is further configured to monitor for shaking of a finger within a threshold distance of the one of the ear regions.

13. A non-transitory computer-readable storage medium storing instructions to be implemented by a computing device having a processor, wherein the instructions, when executed by the processor, cause the computing device to at least:

capture a live video of a user's head;

generate a virtual mirror displaying the live video of the user's head;

track ear regions on the user's head;

perform virtual application of a set of earrings on the ear regions on the user's head;

monitor for a target motion by the user's head among a plurality of predefined target motions, wherein the processor is configured to monitor for the target motion among a plurality of predefined target motions by:

detecting a threshold change in yaw angle when the user's head moves and based on the threshold change in yaw angle, detecting shaking of the user's head side to side; and cycling between different earrings based on the detected at least one of: the head nod or shaking of the user's head side to side, wherein a direction in which different earrings are cycled is based on how the user's head moves; and when at least one target motion by the user's head is detected, change the set of earrings with another set of earrings; and monitor for a target finger motion comprising placement of a finger within a threshold distance of one of the ear regions on the user's head, wherein responsive to placement of the finger within the threshold distance of one of the ear regions on the user's head, only an earring for the one of the ear regions is changed while an earring for the other one of the ear regions remains unchanged.

14. A method implemented in a computing device, comprising:

capturing a live video of a user's head;

generating a virtual mirror displaying the live video of the user's head;

tracking ear regions on the user's head;

performing virtual application of a set of earrings on the ear regions on the user's head; and monitoring for a target finger motion comprising placement of a finger within a threshold distance of one of the ear regions on the user's head, wherein when the target finger motion is detected, changing the set of earrings with another set of earrings, wherein responsive to placement of the finger within the threshold distance of one of the ear regions on the user's head, only an earring for the one of the ear regions is changed while an earring for the other one of the ear regions remains unchanged.

15. A system, comprising:

a memory storing instructions;

a processor coupled to the memory and configured by the instructions to at least:

capture a live video of a user's head;

generate a virtual mirror displaying the live video of the user's head;

track ear regions on the user's head;

perform virtual application of a set of earrings on the ear regions on the user's head; and monitor for a target finger motion comprising placement of a finger within a threshold distance of one of the ear regions on the user's head, wherein when the target finger motion is detected, the processor is configured to change the set of earrings with another set of earrings, wherein responsive to placement of the finger within the threshold distance of one of the ear regions on the user's head, only an earring for the one of the ear regions is changed while an earring for the other one of the ear regions remains unchanged.

* * * * *